Aug. 16, 1960     D. E. HOOKER     2,949,188
SPRING TESTING AND SELECTING APPARATUS
Filed June 29, 1956     2 Sheets-Sheet 1
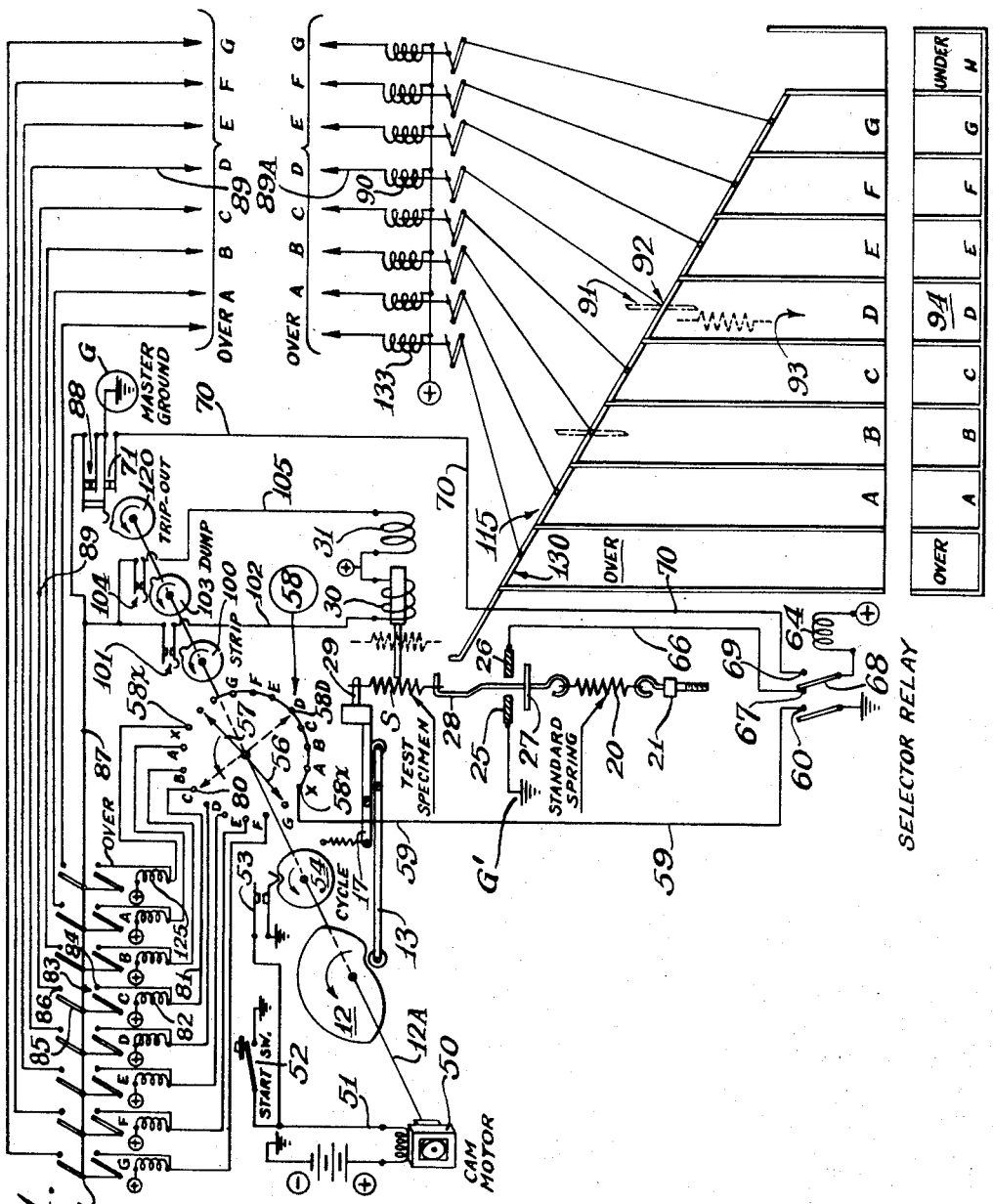
Inventor.
Donald E. Hooker

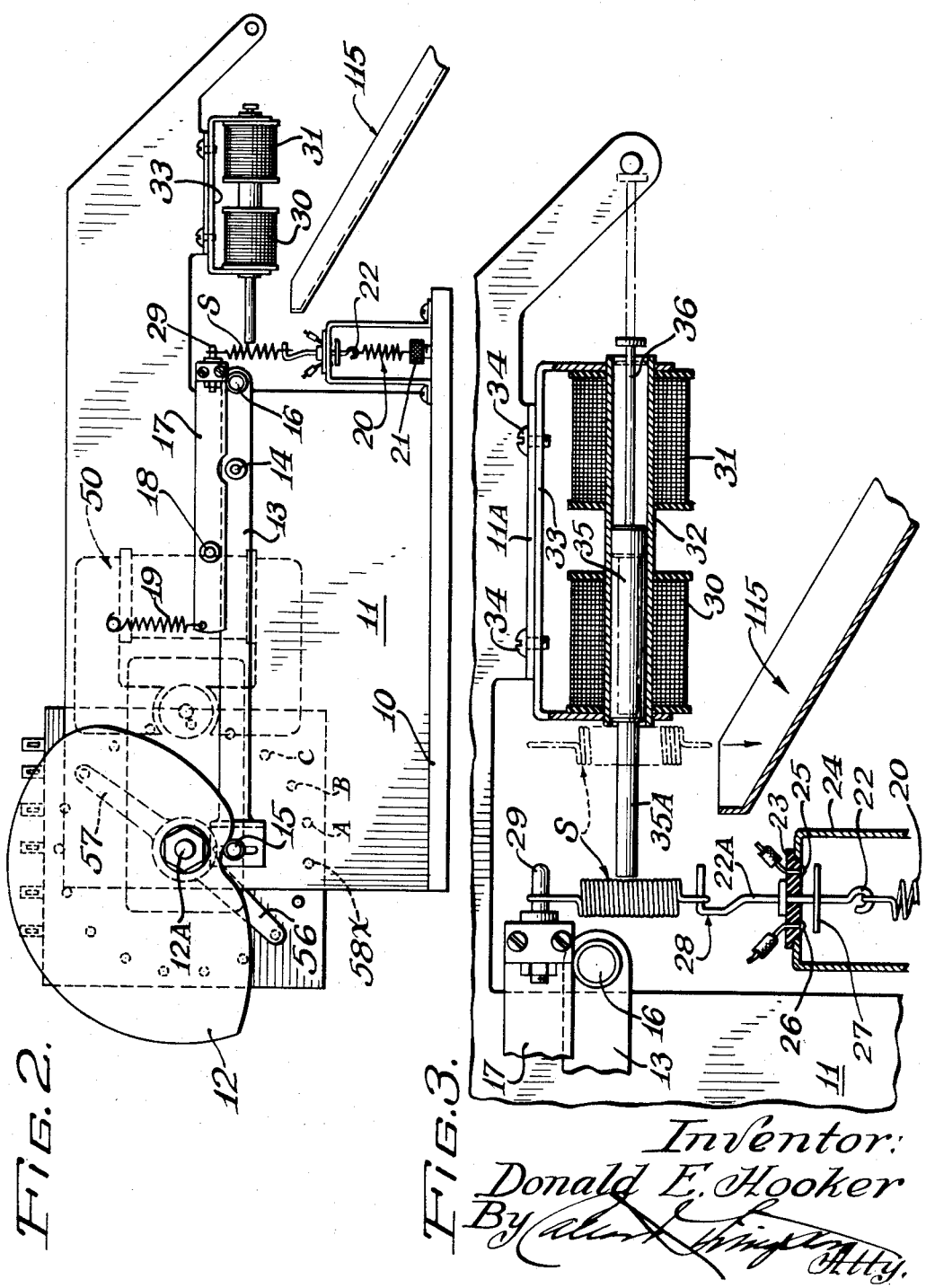

United States Patent Office 2,949,188
Patented Aug. 16, 1960

2,949,188

SPRING TESTING AND SELECTING APPARATUS

Donald E. Hooker, Wilmette, Ill., assignor to Raymond T. Moloney, Chicago, Ill.; American National Bank and Trust Company of Chicago, executor of said Raymond T. Moloney, deceased Filed June 29, 1956, Ser. No. 594,897

8 Claims. (Cl. 209—79)

This invention pertains to improvements in machines for testing springs, one of the principal objects being the provision in a device of this class of a simple means for comparing the strength or rate of a specimen spring with a standard spring and means controlled thereby for automatically segregating the tested springs according to their strength or rate.

A further object is the provision of means for jigging or positioning a test specimen at a testing station, and initiating a testing cycle to automatically set up a selecting circuit when the spring is rated or matched to a standard, together with the provision of means for automatically stripping or removing the test specimen from the jig and dumping it into a sorting receiver provided with compartments which are automatically opened and closed to receive certain springs under control of said selecting circuit.

Additional objects and aspects of novelty and utility relate to details of the construction, operation, and circuit means of one illustrative form of the device described hereinafter in view of the annexed drawings in which:

Fig. 1 is a schematic circuit and operating diagram of the spring testing apparatus;

Fig. 2 is a front elevational detail of the spring-stressing, stripping, and dumping unit;

Fig. 3 is an enlarged fragmentary detail of the testing station with parts shown in section, and including the stripping and dumping mechanism.

In its broadest aspects, the disclosed apparatus consists mainly of a testing means comprising a cam and lever system for stressing a spring against the counter effort of a standard spring; and contact means affected by both springs for establishing a selector circuit when the rate of the test spring equals that of the standard spring; together with an electromagnetic stripping means acting to attract and remove the tested spring from the testing jig, as well as a dumping means operable to discharge the stripped spring for movement into a sorting receptacle which is conditioned to guide the spring into a certain compartment by selective deflecting means controlled by the aforesaid selective test circuit.

Referring to Fig. 2, the illustrative embodiment comprises a base 10, a panel 11, a stressing cam 12 journalled on the panel on shaft means 12A, a lever means including a primary lever 13 pivoted on the panel at 14 and having at one end a tracking roller means 15 engaged by the periphery of the cam, and at its other end a further roller means 16 engageable with and pivotally displaced by a secondary lever 17 pivoted as at 18 on the panel, and normalized by a coil spring 19.

Also mounted on the base 10 is a standard spring unit including spring 20 adjustably and removably anchored at its lower end to a collet screw 21, and having a loop at its upper end fitting on an open hook 22 forming (Fig. 3) part of a contact means which is completed by an upwardly extending stem 22A of said hook projecting through an insulating plug 23 carried on a bracket 24 on said base.

Carried by the plug 23 are contacts 25, 26 adapted to be bridged by a conductive member 27 fixed on the stem, the upper end of the latter also terminating in an upper hook portion 28 which lies just below a spring-receiving pin 29 projecting horizontally from the end of the secondary stressing lever 17.

Thus, a coil or helical spring S to be tested will be provided with loop means at its upper and lower ends and one of each of the loops will be respectively engaged with the pin 29 and upper contactor hook 28 slightly stretched for security.

Appropriate movement of the primary and secondary stressing levers will stretch the upper spring S against the standard spring 20, and when the applied force tensions the tested spring sufficiently to equal the resistance from the standard spring, the latter will yield and the hook contact disc 27 will rise against the stationary contacts 25, 26 and close a selector circuit across the latter, which will be used for selective control purposes in a manner hereinafter to be described.

Means for automatically stripping the tested springs from the test jig includes a pair of solenoids 30, 31 aligned axially upon a common bore tube 32 which in turn is carried by a bracket 33 secured as at 34 to a flange 11A on the main panel plate.

Slidable within the tube 32 is a plunger 35 having a reduced stripper finger 35A at one end adjacent the testing station, the opposite end being provided with a brass tail extension 36 adapted to project more or less beyond the bore of solenoid 31 at all times and to serve as a stop means, as will further appear.

In general, energization of the first or return solenoid 30 attracts the larger mass of plunger 35 fully into its bore so that the stripping finger 35A projects toward the left into a position of very close proximity to the specimen spring S; and said finger, being also of highly magnetizable material, will then attract any spring S having a sufficient content of ferromagnetic or other magnetically permeable material for the purpose.

When the second or stripper coil 31 is energized during the advanced or testing condition of the finger, as depicted in full lines in Fig. 3, and assuming the first coil 30 to be then deenergized, the plunger 35 will move toward the right carrying the test spring S with it to the dotted-line position shown in Fig. 3, whereupon the spring will strike the end of the core tube 32 and be freed from the attractive force of the latter to gravitate into an inclined sorting chute 115 to be guided automatically into one particular bin which will receive all springs having the corresponding rate, this sorting action being responsive to the operation of the control instrumentalities now to be described.

As depicted in the disclosure of Fig. 1, the testing or stressing cam 12 is slowly revolved with shaft 12A by a small reduction-gear motor 50 energized via conductor 51 upon closure of a manual starting switch 52, which is immediately shunted by a cycling switch 53 when the shaft 12A starts the cycling cam 54 a slight amount off stopping position.

Assuming a test specimen spring S to be placed on the jig pin and hook 29, 28, respectively, the slowly rotating cam 12 will actuate the primary and secondary levers 13 and 17 and pull the test spring until the standard spring 20 begins to yield and the bridging contact 27 closes with contacts 25, 26, thereby setting up a selecting circuit which will effect the stripping, discharge, and sorting of the test spring.

Rotating in step with the test cam 12 on shaft 12A is a selector switch means including wipers 56 and 57 acting to bridge pairs of selector contacts generally indicated at 58, individual contacts 58A to 58G and 58X being looped together in common with conductor 59 leading to contact 60 of a selector relay 64.

When the standard test contacts 25, 26, 27 are closed, a circuit is completed from the common return or "ground" at $G^1$ via conductor 66, normally closed selector relay contacts 67, 68, to the coil of relay 64, thereby energizing the latter, which thereupon sets up its own holding circuit at its contacts 68—69, conductor 70, and normally closed master ground breaker contacts 71 to the Master Ground or common at G.

The first consequence of operation of the selector relay is the completion of a sorting or gating circuit via conductor 59, as aforesaid, which occurs the moment the test spring is matched with the standard, so that an operating ground is applied to wipers 56, 57 at a particular instant and position of angular travel corresponding to a particular position of cam 12.

Assuming that the aforesaid particular position corresponds to one of the gang or looped contacts 58D, then the wipers will be lodged in the dotted line position on contact 80 connecting via conductor 81 to energize a particular sorting relay 82, thereby closing its relay switch contacts 83—84 and 85—86, the first contact pair setting up a holding circuit for this relay via conductor 87 to Master Ground or breaker switch contacts 88; and the second pair of said sorting relay contacts 85—86 applying operating ground via conductors 89, 89A to energize a corresponding gate or deflector coil 90, with the result that a trap or selector vane 91, pivoted as at 92 in sorting chute 93, will be opened, as indicated in dotted lines, to guide the tested spring into a certain compartment or box 94 by the time the spring is stripped and dumped.

When a test match or selection is effected, as aforesaid, the motor does not stop. The master selector relay having locked-in its own holding circuit instantly at contacts 68, 69 the moment the matching of the specimen with the standard occurs, the motor continues to run and no further sorting relays will be energized because the test contacts 25, 26, 27 are now disabled at selector relay contact 67; however, as the shaft 12A approaches completion of one full revolution, the stripper cam 100 will close stripper switch contacts 101 and complete a circuit via conductor 102 to the stripper coil 30, thereby energizing the latter to attract the test specimen and strip it from the testing jig.

Shortly thereafter the dump or release coil 31 will be energized by closure of dump switch contacts 104, by dump cam 103, to complete a circuit via conductor 105 to said coil, with the result that the plunger 35 will shift to the right (stopper switch contacts 100 opening at this time) carrying the tested spring into the dotted-line position, as in Fig. 3, and causing same to be dislodged from the finger upon striking the protruding portion of tube 32, so that the spring gravitates into the sorting runway 115 and starts down the incline thereof.

Any selector trap 91 will be opened substantially in advance of the arrival of the discharged spring by reason of the delay which occurs between the instant the appertaining gate coil 90 is energized by its sorting relay 82, and the subsequent opening of the stripper switch 101, and closure of dump switch 104, together with the time required for the discharged spring to begin descent along runway 115.

Following shortly after the operation of the stripping and dumping control switch means 101, 104 by cams 100 and 103, the shaft 12A will have completed its full cycle and the breaker or trip-out cam 120 will open the master breaker contacts 71 and 88 to the Master Operating Ground G, thereby disconnecting all power from all holding circuits and dropping out the selector relay 64 and any sorting relay 82, as well as the corresponding Gate Coil 90.

Also at this time, the master cycling switch contacts 53 will open to stop the motor 50, with all components again in the starting condition in readiness for the next test.

A further feature of operation resides in the selection and segregation of those springs which are either over or under the required rating. Those test specimens which are under requirements will yield without extending the standard spring, so that the test contacts 25, 26, 27 can't close during the cycle; but the stripping and dumping operations occur nevertheless at the termination of each cycle, and the test specimen will be discharged at the end of the cycle and will traverse the full length of runway 115 to lodge in the last compartment marked "Under," no gate or trap being necessary for this selection.

Those springs which are over the required rating, on the other hand, begin to extend the standard spring at the beginning of the cycle, so that when selector switch wipers 56, 57 reach the first position at contacts 58X, a circuit is already set up to energize the selector relay 64 and the corresponding sorting relay 125, which opens the uppermost or first trap 130 because of energization of the appertaining gate coil 133. In the meanwhile, the testing cycle continues toward completion and the over-rated spring is automatically stripped and dumped for movement into the compartment labeled "Over" and the cycle is terminated as heretofore described.

Within its range and elastic limits, the standard test spring may be selectively adjusted by operation of the lower anchoring means 21 to provide a range of standard reference ratings, there being a battery of "rating" relays, such as the relay 82, for setting up other selecting and sorting circuit means such as heretofore described in conjunction with said relay 82 and the appertaining gate means 90, 91, etc.

It is to be understood that the use of battery and ground symbols in Fig. 1 is purely a convenience to simplify circuitry, it being intended that any suitable power source be utilized.

The disclosed embodiment affords a relatively simple, reliable, and accurate spring tester and sorter which is self-cycling, easy to operate and maintain, and frees the operator's hands to inspect and select (or reject) acceptable specimen springs for test while the preceding test is going forward; and by the time the tested spring is automatically stripped from the jig, the operator is ready to position the next specimen, so that a continuous flow of tests may go forward without hurrying the operator. This feature is of especial advantage in sorting out springs from mixed lots of closely related but actually differing rates which have been lumped together in one lot (frequently including defective or unacceptable rejects along with others) which have to be manually separated and sometimes disentangled for processing.

I claim:

1. Spring testing apparatus comprising: a jig for receiving a specimen spring for test, said jig having two movable members each adapted to removably receive an end portion of said specimen to support the latter for tensioning; motor drive means for moving a first one of said jig members to tension said specimen; standard spring means having connection with the second one of said jig members to oppose said tensioning of the specimen; jig switch means including a first contact means having operative connection with said second jig member for movement by the latter when the tensioned specimen overcomes the resistance of the standard spring, and a further contact means cooperable with said first mentioned contact means and connected with the latter in a control circuit for opening and closing said control circuit dependently upon predetermined movement of said second jig member.

2. Apparatus according to claim 1 further characterized by the provision of selecting circuit means including electrically-controlled multi-position switch means connected for operation under control of said control circuit and said jig contact means for setting up any of a plurality of corresponding selection circuits responsive to predetermined movement of said second jig member by a specimen spring tensioned by the first jig member as aforesaid.

3. Apparatus as set forth in claim 2 further characterized by the provision of electrically-controlled stripping means including an electromagnetic stripper device positioned opposite said jig and operable when energized to withdraw and hold a jigged spring specimen; and circuit means connected for operative control by said selecting circuit means for energizing said stripper device responsive to setting up of a selection circuit as aforesaid, together with breaker switch means operatively controlled by said selecting circuit means and connected for operation to deenergize said stripper device, at least, subsequent to each stripping energization as aforesaid.

4. In testing apparatus for coil springs: a testing jig for holding a spring, the same having two relatively movable spring-engaging members, a standard spring means urging one of said members to a starting position, and rotatable means having a cycle of operation for moving the other spring-engaging member from and back to a starting position during each cycle to tension a test spring held by said engaging members; test contact means moved into normally open-circuit condition cooperatively with that one of the spring-engaging members which is moved by said rotatable means in the starting position of the latter, said test contact means being closed responsive to movement of said last-mentioned spring-engaging member out of starting position; and rotary switch means driven in step with said rotatable means and having circuit-connection means controlled by said test contact means for operating to establish selecting circuits at various different angular positions each corresponding to a certain angular position of said rotatable member and to a corresponding condition of tension for a test spring tensioned thereby; and electrically-operated spring-stripping means controlled by said rotary switch means for actuation at a point in the angular travel thereof which is angularly near the end of the cycle of rotation of said rotatable member to remove a test spring from said jig.

5. Apparatus for testing coil springs and comprising: a jig for holding a specimen spring and including a first movable part engageable with one end of said spring for tensioning same; a rotatable member and means drivingly connecting same with said first movable part for progressively tensioning the specimen spring responsive to angular movement of said rotatable member; a second movable part for the jig engaged by the other end of the specimen spring; contact means opened and closed responsive to back and forth movement of said second movable part; an adjustable standard spring connecting with said second movable part and normally urging the latter to a starting condition with said contact means open, and further moved by action of said tensioning means in tensioning the specimen spring to close said contact means when the effort of the two springs is substantially matched; relay means connected with said contact means to be operably controlled by the latter, and a test control circuit including connections opened and closed by said relay means.

6. Apparatus according to claim 5 further characterized by the provision in said test control circuit of a rotary switch and means driving same synchronously with said rotatable member to establish independent sorting circuits each corresponding to a certain angular position of the rotatable member; and electromagnetic spring-stripping and releasing means energizable and deenergizable by switch means actuated by a switch-operating means moved in step with said rotatable member to strip a test spring from said jig near the end of each cycle of angular travel of the rotatable member; means providing sorting receptacles to receive stripped springs of different rate; and electromagnetically actuated sorting means selectively actuated by said sorting circuits for directing released stripped springs into particular sorting receptacles.

7. In a machine for testing springs, a spring jig including two movable jig members to each of which a tensioning portion of a spring under test is to be attached; power-driven displacement means for progressively moving one of said jig members through a cycle of operation to increase the tension on the tested spring in proportion to the displacement action in each said cycle, the second one of said jig members having means for attaching thereto one tensioning portion of a standard spring; means for securing another tensioning portion of said standard spring whereby the latter can oppose the aforesaid tensioning of the test spring; and test switch means cooperably associated with said second jig member for operation concomitantly with movement of the latter by tensioning of the test spring as aforesaid an amount sufficient to overcome the opposing action of the standard spring to actuate said test switch means for the purpose of controlling an associated test circuit means dependently upon the amount of displacement of said power-driven means necessary to overcome the opposition of the standard spring as aforesaid.

8. Apparatus as set forth in claim 7 further characterized in that said power driven displacement means includes angularly movable means displaced in each cycle proportionately in step with that one of the movable jig members which is moved to tension the test spring, together with selector-switch means including angularly displaced movable contact means driven in step with said power-driven displacement means and having cooperative, plural, and angularly located stationary selector contact means progressively engageable by said movable contact means; together with test-circuit means connected for control selectively by said movable and stationary contact means and by said test switch means to selectively establish any of a plurality of test control circuits.

References Cited in the file of this patent
UNITED STATES PATENTS

| | | |
|---|---|---|
| 1,336,543 | Stull | Apr. 13, 1920 |
| 2,319,833 | Troy | May 25, 1943 |
| 2,355,468 | Robb | Aug. 8, 1944 |
| 2,409,265 | Fenton | Oct. 15, 1946 |
| 2,789,693 | Harder | Apr. 23, 1957 |